May 16, 1961   H. F. PRASSE ET AL   2,984,187
POWER STEERING PUMP
Filed Feb. 20, 1956   3 Sheets-Sheet 3
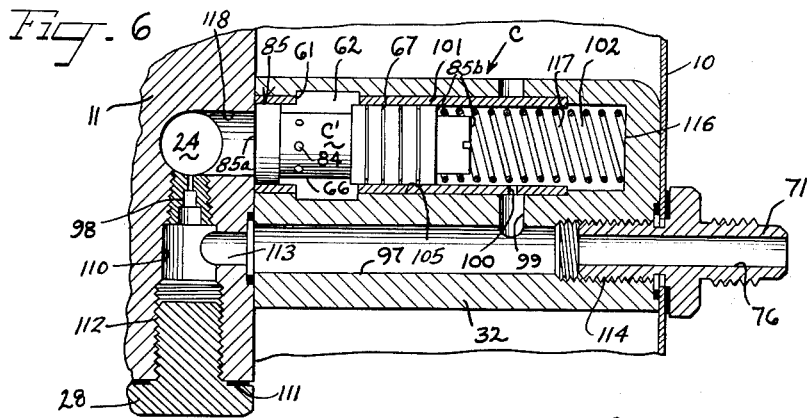
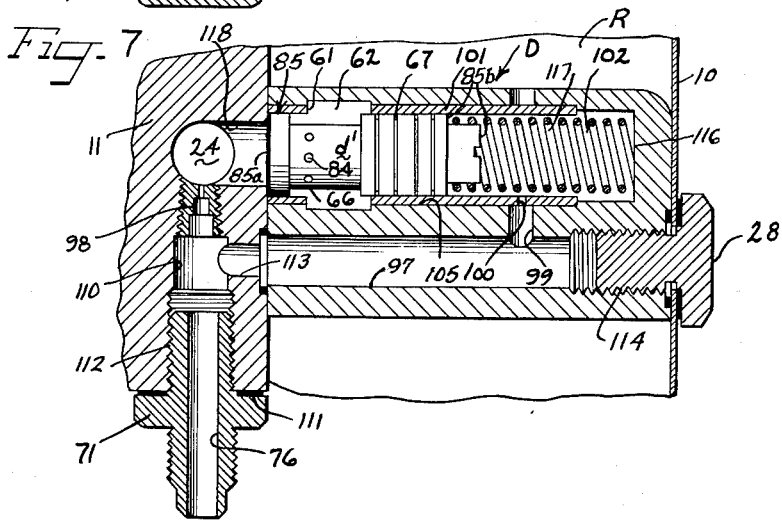
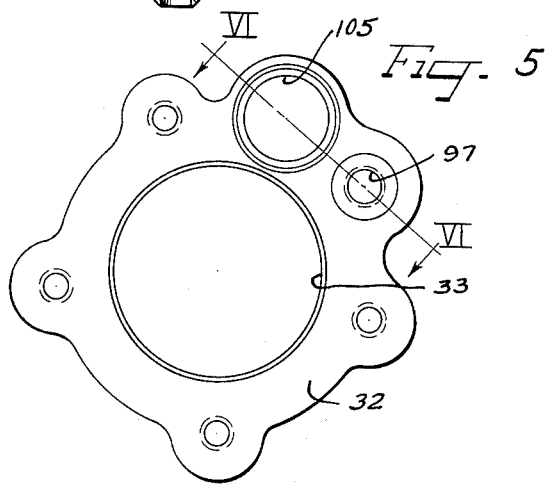
Inventors
HERBERT F. PRASSE
JOHN E. THRAP
by Hill, Sherman, Meroni, Gross & Simpson Attys.

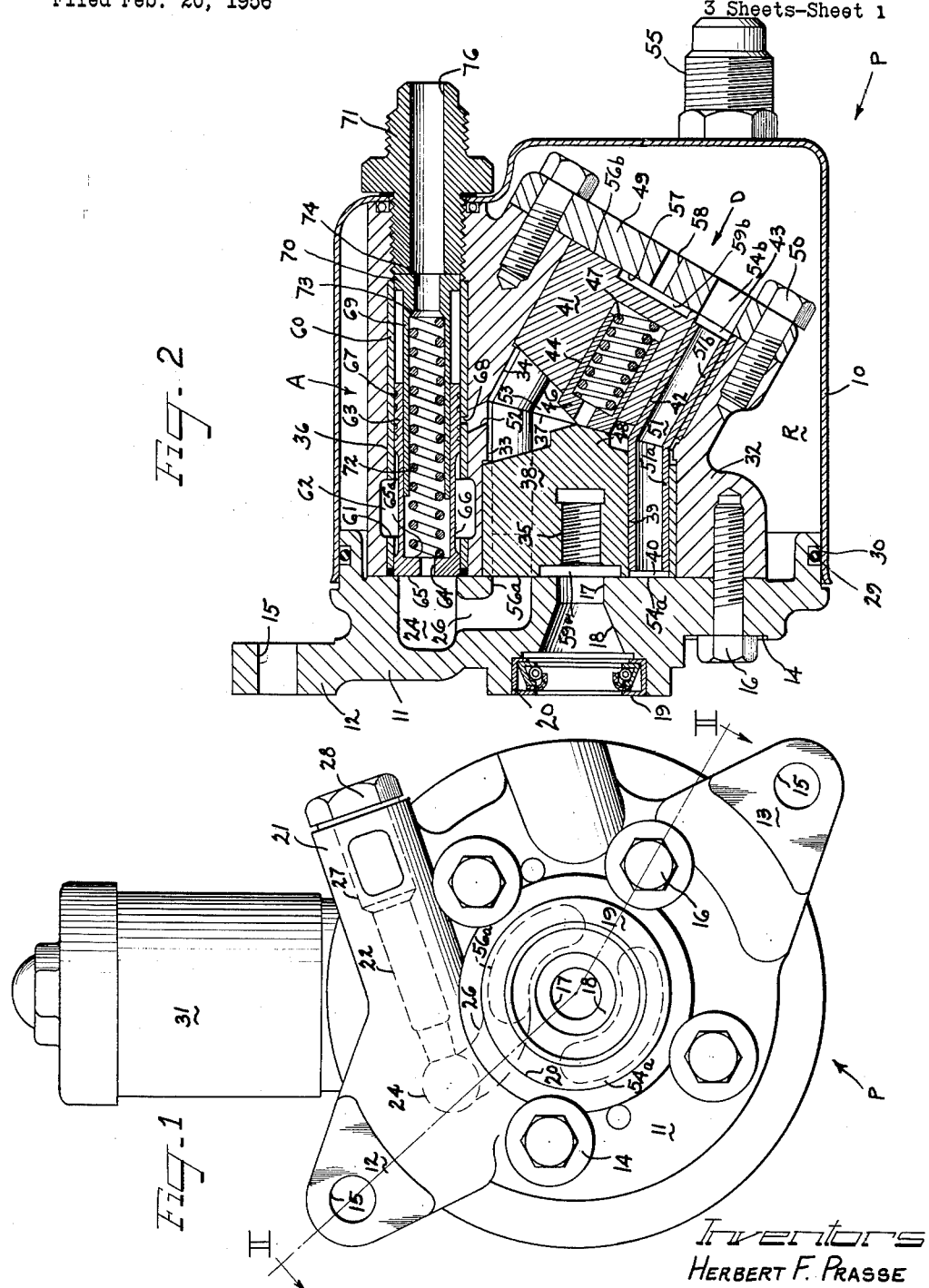

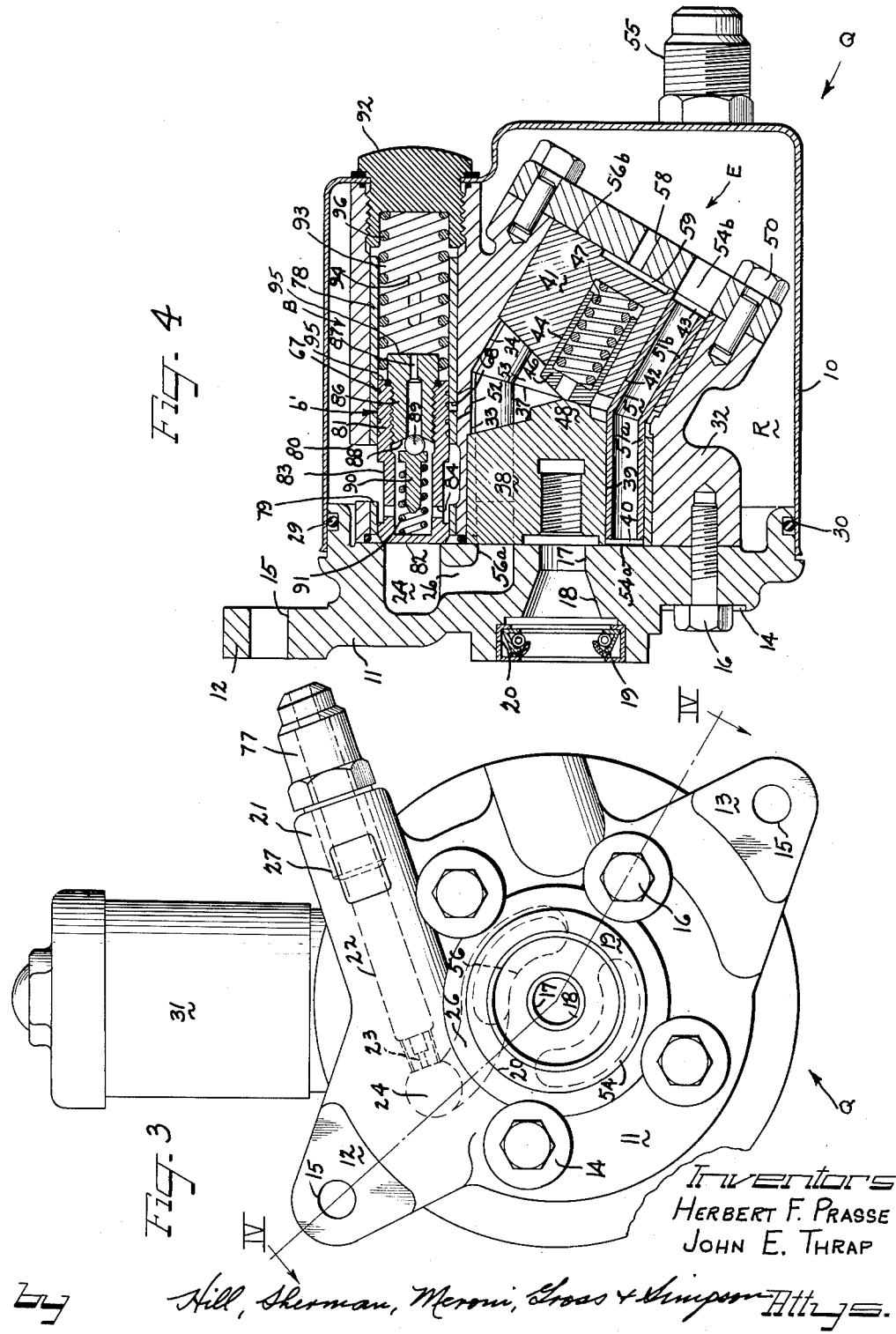

United States Patent Office 2,984,187
Patented May 16, 1961

2,984,187
POWER STEERING PUMP

Herbert F. Prasse, Gates Mills, and John E. Thrap, Cleveland, Ohio, assignors to Thompson Ramo Wooldridge Inc., a corporation of Ohio Filed Feb. 20, 1956, Ser. No. 566,416

9 Claims. (Cl. 103—42)

This invention relates to an improved type of hydraulic pump for use in hydraulic power systems such as an automobile power steering system or power assisting system utilized to facilitate a control function. Specifically, this invention relates to an improved type of hydraulic pump having a plurality of inlet and outlet ports in the pump housing and controlled by a valve assembly which permits the selective use of a particular inlet and outlet port depending on the particular location and accessibility of the pump.

The current use of power assisting control systems, both in passenger cars, tractors, and other types of vehicles, has resulted in a complex mounting problem for the hydraulic pump, not only from the standpoint of the best location for the inlet and discharge fittings on the pump housing, but also from the fact that frequently the pump is required to be installed in an engine compartment already crowded with other accessories.

The mounting problem is further aggravated because pumps of similar operating capacities cannot be interchangeably applied to different environments. For example, most passenger car installations utilizing power steering pumps mount the pump on the left side of the automobile engine and the discharge and return lines are brought up to the left side or rear of the pump. In tractor installations, on the other hand, the pump is usually mounted on the right side of the engine making it necessary to bring the discharge and return lines out of the right side or rear of the pump in order to obtain accessibility and simplicity of installation.

According to the present invention a pump is provided for mounting either on the left or right side of an engine, thus greatly simplifying installation, substantially reducing unit cost, and eliminating many of the fittings and adapter kits usually required. The pump of the present invention is readily interchangeable in different operating environments thereby reducing the number of parts necessary for a repair inventory, and minimizing related servicing and maintenance problems.

It is an object then of the present invention to provide an improved type of hydraulic pump for use in automobiles, tractors or other vehicles.

Another object of the present invention is to provide an improved type of hydraulic pump which is adapted to be readily mounted at any convenient point in the engine compartment of an automobile, tractor or other vehicle.

A further object of the present invention is the reduction in unit cost of a typical power assisting pump by providing a plurality of discharge ports in the pump body, which may alternately receive an interchangeable plug or flow fitting, thereby facilitating accessibility, installation and the use of a single power assisting pump in many types of vehicles heretofore requiring a separate unit.

Many other objects and advantages of the present invention will become manifest to those versed in the art upon making reference to the detailed description which follows and the accompanying sheets of drawings.

On the drawings:

Figure 1 is an elevational view of a pump provided in accordance with this invention and utilizing a rear discharge outlet;

Figure 2 is an irregular cross-sectional view of the pump of Figure 1 with parts shown in elevation taken generally along the line II—II of Figure 1;

Figure 3 is an elevational view of a pump embodying an alternative form of the present invention wherein a side discharge of the pump is shown;

Figure 4 is a cross-sectional view of the pump of Figure 3 with parts in elevation taken generally along the line IV—IV of Figure 3;

Figure 5 is an elevational view of a pump with some parts omitted for clarity and indicating the location of a flow valve assembly according to the present invention;

Figure 6 is a fragmentary cross-sectional view, substantially along the line VI—VI of Figure 5 with parts in elevation; and Figure 7 is a fragmentary cross-sectional view, with parts in elevation, similar to Figure 6 but illustrating a modified flow valve assembly showing a side discharge arrangement of the flow valve fittings.

As shown on the drawings:

In the embodiment of the invention illustrated in Figures 1 and 2, a hydraulic power assisting pump P includes a cup-shaped casing member 10, closed at its open end by a valve plate cover member 11 and having a pair of mounting ears 12 and 13, on the valve cover plate 11, bored as at 15 to receive suitable fasteners for mounting purposes. A plurality of mounting bosses 14 provide a bearing surface for a series of fasteners 16 which hold the valve plate cover member 11 in abutting relationship with a pump assembly D.

The valve plate 11 includes a generally central bore 17 to permit a driving engagement of the rotating elements of the pump assembly D with a drive shaft (not shown). The bore 17 is countersunk as at 18, and a flexible hydraulic seal means 19 is received in a counterbore 20 in the face of the valve plate member 11 to prevent the leakage of fluid around the pump drive shaft.

The valve cover plate 11 also includes a boss 21 which is bored as at 22 to form a side discharge flow passage. Means forming an orifice 23 are provided in the bore 22 through which pump output is discharged from a discharge cavity member 24 when side discharge is contemplated through the side discharge boss 21. The bore 22 includes an enlarged threaded portion 27 in which a plug member 28 is inserted whenever it is desired to close the discharge boss 21.

Referring now more particularly to Figure 2, the casing 10 is shown enclosing the pump assembly D. An O-ring seal member 29 in a peripheral recess 30 in the valve cover plate 11 prevents any hydraulic leakage between the casing 10 and valve cover plate 11 and a working fluid reservoir R is thus formed between the pump assembly D and casing 10. The level of fluid in the reservoir R is properly maintained by the provision of a filler cap assembly 31, as better shown in Figure 1.

The pump assembly D is of the angular piston and rotary cylinder block type, and is comprised of a housing 32 in which is formed a pair of bores 33 and 34 having relatively angularly offset intersecting axes, and a third bore 36 generally parallel to the bore 33. The angularly offset bores 33 and 34 are generally cylindrical in configuration to form in the interior of the housing 32 a plane of intersection between the bores 33 and 34 indicated by the reference numeral 37.

A cylinder block 38 is journalled within the bore 33 being complementary in size and shape with respect thereto and having its axis coincident with the axis of the bore 33. Radially outwardly of the axis of the cylinder block 38 are a plurality of circumferentially spaced axially extending bores 39 which form a corresponding plurality of cylinders or pumping chambers 40. A splined or threaded bore 35 is provided inwardly of the pumping chambers 40 coincident with the axis of the cylinder block 38 to provide a driving engagement for the cylinder block 38 through the valve plate 11 with a drive shaft (not shown).

The bore 34 is provided with a similar cylinder block 41, which is generally cylindrical in configuration, being complementary in size and shape to the bore 34 and having its axis of rotation coincident with the axis of the bore 34. The block 41 also including a plurality of circumferentially spaced radially outwardly displaced bores 42, forming a plurality of cylinders or pumping chambers 43.

The cylinder block 41 is centrally bored as at 44 to slidably receive a sleeve member 46. A spring 47 in the sleeve 46 urges the outer face of the sleeve 46 into contact with a raised portion 48 on the cylinder block 38 to maintain a hydraulic seal between the ends of the cylinder blocks 38 and 41 with the valve plate 11, and a pump housing cover plate 49, which closes the pump housing 32. A plurality of fasteners 50 securely retains the cover plate 49 in sealing engagement with the pump housing 32.

A hollow angular piston or sleeve 51 is provided to interconnect each respective pair of bores 39 and 42 in the cylinder blocks 38 and 41. Each angular piston 51 has an inclined arm portion such as an arm portion 51a reieved in the bore 39 of the cylinder block 38, and an arm portion 51b received in the bore 42 of the cylinder block 41.

The angularly inclined arm portions 51a and 51b of the pistons 51 are journalled in the respective cylinder blocks 38 and 41 and have hollow interiors to provide a flow passageway through each piston or sleeve 51.

The pistons 51 connect the cylinder blocks 38 and 41 for rotation in unison such that any rotation of the cylinder block 38 will be translated through the pistons 51 to simultaneously rotate the cylinder block 41.

Upon rotation of the blocks, the effective volume of the interconnected pumping chambers will be alternately increased and decreased thereby providing a suction and a propulsion at opposite sides of the pump. An inlet port 54b is formed in the end plate means formed by the cover plate 49 through which fluid from the reservoir R is drawn by the pump.

Referring now to Figure 1 in conjunction with Figure 2, the internal face of the valve plate 11 has a kidney-shaped outlet port 56a, formed in a porting surface 54a discharging fluid at pump discharge pressure through the registering passage 26 to the pump cavity chamber 24. The kidney-shaped inlet port 54b is formed in the porting surface 56b provided in the pump housing cover plate 49.

A centrally disposed port 58 in the pump housing cover plate 49 communicates a recess 59b formed between the porting and sealing surfaces of the end plate means and the cylinder block to a zone at lower pressure than the pressure in the knee portion of the pump, namely, to the reservoir R. A similar recess 59a is provided between contacting faces of the cylinder block 38 and valve cover plate 11.

The bore 36 in the pump housing 32 registers with the pump cavity chamber 24 and contains a flow valve assembly A including a valve liner 60 having a port 61 in registry with a spillway chamber 62 which in turn communicates with the pump reservoir R. A flow control valve spool 63 is slidably received in the valve liner 60, and has a pressure responsive face 65 subject to discharge pressure generated by the pump. A centrally disposed flow metering orifice 64 is formed in the upstream face 65 of the flow control valve spool 63 and in the embodiment of Figures 1 and 2 meters discharge flow from the pump cavity chamber 24 for discharge through the rear discharge port of the pump.

A plurality of undercuts or grooves 67 in the enlarged diameter portion of the flow control valve spool are provided, if desired to balance the pressures acting as the periphery of the valve spool. The central chamber space 53 between the cylinder blocks 38 and 41 is selectively vented whenever the reduced portion 66 of the flow valve registers with a knee venting by-pas orifice 68 in the valve liner 60 through a communicating passage 52 formed in the pump housing 32. Unless otherwise modified it will be understood that the pressure in the space 53 is at some intermediate value between the values of pump inlet and outlet pressures. A spring retainer 69 supports and guides the flow control valve spool 63 for sliding movement and is bottomed at its downstream end 70 by a discharge fitting taking the form of a nipple 71 threaded in the pump housing 32.

A spring 72 is seated on an internal shoulder 73 in the spring retainer 69 and loads the flow control valve spool 63 in an opposite direction against the pump generated output pressure in the pump cavity chamber 24. The end 70 of the spring retainer 69 includes a passage 74 which registers with a main discharge passage 76 in the pump discharge fitting or nipple 71, thus communicating the pump output with a point of utilization such as a hydraulic motor or actuator.

The flow valve assembly A shown in Figure 2, maintains a constant flow from the pump P throughout a wide range of pump operating speeds. At idling engine speeds, the orifice 64 in the flow control valve spool 63 passes a predetermined flow from the pump cavity discharge chamber 24 through the flow control valve and discharge fitting 71 to the hydraulic motor or actuator at a given pressure drop across the orifice. Discharge pressure is applied to the motive surface 65 and some value of pressure, reduced by the amount of the pressure drop across its orifice, is applied to the surface 65a. The continuous biasing force exerted by the spring 72 plus the force on the surface 65a counters the force on the surface 65.

As engine and pump speeds increase, pressure drop variations result whereupon the resistance of the spring 72 is overcome and the flow control valve spool 63 is moved towards open position. If the flow rate is sufficiently high to move the flow control valve 63 a sufficient amount to uncover the spillway passage 62, recirculation of output fluid from the pump to the reservoir R will result. Whenever the flow control valve spool 63 has moved downstream a sufficient distance to allow recirculation through the spillway passageway 62, the reduced portion 63 of the valve spool will also come into registry with the by-passing relief orifice 68 so as to permit a venting of pressure in the central chamber 53 through the communicating passageway 52 to the reservoir R, thereby causing the cylinder blocks 38 and 41 to move toward each other a slight amount and permitting direct circulation of hydraulic fluid from the inlet to the discharge port. By thus reducing the pressure in the chamber 53 the volumetric efficiency and pumping action of the pump assembly D will be substantially reduced, thereby lowering horsepower requirements and permitting cooler operating characteristics.

It will thus be appreciated that the pump assembly P, illustrated in Figure 2, presents a novel type of power pump in which the output of an angular piston and rotary cylinder block type pump D, is regulated by a novel flow control valve assembly A, to provide a power pump with a substantially constant output throughout a wide range of operating speeds and conditions. Provision for recirculation of pump discharge flow is made, and a selective reduction in volumetric efficiency of the pump assembly is also provided to reduce the horsepower drain and heating characteristics of the pump when over capacity operating conditions occur.

Referring now more particularly to Figures 3 and 4, a side discharge form of the hydraulic pump and employing a different form of flow valve is illustrated. Like reference numerals and letters are used to identify similar parts wherever possible.

In Figure 3, the pump assembly Q has a side discharge flow fiting or nipple 77 provided in place of the discharge plug 28. The pump assembly Q in Figure 3 differs from the pump assembly P of Figure 1 in that all pumped fluid at pump cavity discharge pressure in the chamber 24, flows through the flow metering orifice 23 to the bore 22 where it passes through the side discharge flow fitting or nipple 77 to communicating conduits which connect to the hydraulic motor or power steering actuator, rather than through the rear discharge flow fitting 71, as illustrated in Figure 2.

Referring now more particularly to Figure 4, a different form of flow valve assembly is illustrated in the pump assembly Q, and is designated generally by the reference letter B.

The flow valve assembly B, is comprised of a valve liner 78 having an annular recess or series of recesses 79 in registry with a spillway passage 80, to permit a transfer of fluid through the passages to the reservoir R.

A flow control valve spool assembly b' comprises a flow control valve spool 81, slidably positioned in the valve liner 78 and has a face portion 82 subjected to pump discharge pressure. The flow control valve spool 81 is hollow and includes an intermediate reduced diameter portion 83. A plurality of bleed orifices or ports 84 are provided in the reduced diameter portion 83 of the flow control valve spool 81 to vent the internal hollow portion of the flow control valve spool 81 to the reservoir R.

The flow control valve spool assembly b' at one end has a check valve seating member 86 threaded into the open end portion of the flow control valve spool 81. The check valve seating member includes an opening 87 controlled by a valve 89 engaged against a valve seat 88 by a retainer 90. A spring 91 seats on one face of the flow control valve spool 81 and the retainer 90 and urges the ball check valve 89 into seating engagement with the valve seat 88.

The ball check valve 89 is unseated whenever a predetermined pressure is reached on the downstream side of the valve, thereby venting fluid from the pressure space in the valve spool 81 through the ports 84 to the reservoir R.

A plug 92 closes the discharge outlet in the pump housing 32 and a pressure space 93 is formed between an end face or surface 95 provided by the flow control valve spool 81 and plug 92.

In order to operate as a flow control valve the variations in pressure drop across the orifice 23 are used as a controlling variable in regulating the movement of the valve spool 81.

A port 94 communicates pressure on one side of the orifice 23 into the pressure chamber 93 thereby acting on the end face or surface 95 of the control spool valve assembly b'. The opposite end face or surface 82 is subject to the discharge pressure in the cavity chamber 24 on the other side of the orifice 23. A control spring 96 continually biases the flow control spool valve assembly in one direction.

When the flow rate through the orifice 23 increases beyond given value, the valve spool 81 opens to by-pass partial pump discharge from the cavity 24 to the reservoir R.

The valve also prevents excessive pressure build up in the hydraulic circuit. If a predetermined excessive pressure builds up in the hydraulic circuit, the spring biased ball valve 89 will be unseated, thereby venting the chamber 93 through the ports 84 in the flow control valve spool 81 to the reservoir R. The drop in discharge pressure in the chamber 93 acts as a trigger unbalancing the forces on the valve spool 81 and opening the valve assembly to recirculate fluid from the chamber 24 through the spillways 80 to the reservoir.

The opening movement of the flow control valve spool assembly b', also permits the reduced diameter portion undercut 83 to come into registry with the relief orifice 68 thereby venting the chamber 53 to the reservoir R, reducing the volumetric efficiency of the pump and minimizing over-heating whenever an over capacity condition is obtained.

With the valving arrangement of Figures 3 and 4 the side discharge 21 is utilized. Accordingly, a constant flow of fluid as regulated by the flow control valve is delivered out the side of the pump through the nipple 77.

Referring now more particularly to Figures 5, 6 and 7, another embodiment of a valve is indicated at C. Figure 5 illustrates the location of the valve assembly in the pump casing and Figures 6 and 7 illustrate how the valve C can be used to effect either a side or an end discharge arrangement for the pump.

The flow valve assembly C has a valve spool 85 formed with a front end face or surface 85a and a rear face or surface 85b. The valve spool is slidably positioned within a liner 101 carried within a bore 105 formed in the pump housing 11.

Fluid is discharged through means forming an orifice indicated at 98 and carried by the pump housing 11. Thus, fluid flows from the cavity 24 through the orifice 98 and into a passage 110 formed in the pump housing 11. The passage 110 constitutes a bore which extends from a side surface of the pump indicated at 111. The end portion of the passage 110 is threaded as at 112 and receives a correspondingly threaded plug 28 as indicated in Figure 6 for a rear discharge arrangement or a correspondingly threaded nipple 71 as indicated in Figure 7.

Intersecting the passage 110 is an angularly offset passage indicated at 113 which opens into a passageway 97 running generally towards the rear end of the pump housing. The end of the bore 97 is threaded as at 114 and receives a correspondingly threaded nipple 71 as indicated in Figure 6 for a rear discharge arrangement or a correspondingly threaded plug 28 as indicated in the side discharge arrangement of Figure 7.

In the embodiment of Figures 6 and 7, the bore 105 is closed by an end wall portion indicated at 116 thereby forming a pressure space 102 behind the valve spool 85. A continuous biasing means in the form of a coil spring operates as a control spring 117 and has the coils at one end bottomed against the wall 116 and the coils at the opposite end bottomed against the end surface 85b of the valve spool 85.

An aperture 100 is provided in the valve liner 101 and communicates fluid at pressure on one side of the orifice 98 from the bore 97 through an offset angular passage 99 through the orifice 100 into the pressure space 102. The pressure thus communicated acts upon the rear or end surface 85b of the valve spool 85. Pressure on the other side of the orifice 98, namely the full pump output pressure at the cavity 24 is transmitted through a passageway 118 formed in the pump housing 11 to the front end surface 85a of the valve spool 85.

In all other respects, the valve spool 85 is similar in structural details and in functional operation to the valve spool 81 disclosed in connection with the embodiment of Figure 4. Accordingly, like reference numerals have been applied to like parts and it will be understood that the interior of the valve spool 85 is similar to that shown in detail in Figure 4.

Thus, within the normal range of operating pressures, the flow output of the pump will be discharged through the orifice 98 and the quantum of flow will be regulated by the flow control valve spool 85. If the flow rate increases beyond a predetermined value, the pressure differential sensed by the valve spool 85 and manifested across the orifice 98 will result in an opening of the valve spool 85 whereupon excess beyond the desired output from the pump will be bypassed from the cavity 24 to the reservoir R.

In the event of an excessive pressure build up within the hydraulic circuit, the pressure present in the present in the pressure space 102 will act upon the ball valve 89 thereby venting the pressure space 102 directly to the reservoir R. The forces acting on the valve spool 85 will then be unbalanced and the valve spool 85 will be moved to the right, using the plane of orientation of Figures 6 and 7, thereby opening the valve and recirculating the pump output to the reservoir R.

At the same time, the knee portion of the pump will be vented to the reservoir R and direct interport by-passing will be effected across the porting surfaces between the end plate means and the cylinder blocks 38 and 41.

Although various minor modifications might be suggested by those versed in the art, it should be understood that we wish to embody within the patent warranted hereon all such modifications as reasonably and properly come within the scope of our contribution to the art.

We claim as our invention:

1. A pump comprising a substantially cup-shaped casing member, a valve cover plate member closing said casing member and having an inner and outer face portion and a discharge cavity chamber, fluid displacement means in said casing member abutting the inner face of said valve cover plate and supplying liquid at increased pressure to said discharge cavity chamber, a housing enclosing said fluid displacement means, an inlet and an outlet in said housing, flow control means in said housing operatively interposed between said inlet and outlet in said housing, a rear inlet port and a rear outlet port formed in said casing member, a side outlet port formed in said valve cover plate member, means communicating said rear and side outlet ports and said pump outlet with said discharge cavity chamber, said casing member, said valve cover plate and said pump housing together forming a fluid reservoir for said rear inlet port, means for maintaining working fluid in said reservoir above the level of said rear inlet port, a flow nipple in said rear inlet port, a plug and a flow nipple inserted in corresponding ones of said side and rear outlet ports, to adapt the pump for either a side or rear metered discharge flow and means in said casing forming a metering orifice between said discharge cavity chamber and said flow nipple.

2. A pump comprising a generally cylindrical casing having a cover plate forming a front portion at one end thereof and further including a rear portion at the opposite end thereof and side portions therebetween, said casing having a discharge cavity chamber, rotary fluid displacement means in said casing for pumping fluid to said discharge cavity chamber, mounting means formed on said casing at said cover plate to attach said pump to a support, an inlet in said casing for supplying fluid to said rotary fluid displacement means, a plurality of openings in said casing communicating with said discharge cavity chamber including an opening in said cover plate at a side portion of said casing forming a side discharge outlet and an opening in said rear portion of said casing forming a rear discharge outlet, one of said openings having a plug therein and the other of said openings having a nipple therein, said openings being interchangeably adapted to provide said pump for side or rear discharge selectively by reversing the plug and nipple relationship of the openings and means forming a metering orifice in said casing between said discharge cavity chamber and said nipple.

3. A pump comprising a casing having front, rear and side portions and having a discharge cavity chamber formed therein, rotary fluid displacement means in said casing for pumping fluid to said discharge cavity chamber, mounting means formed on said casing to attach said pump to a support, an inlet in said casing for supplying fluid to said rotary fluid displacement means, a plurality of openings in said casing including an opening in said side portion of said casing forming a side discharge outlet and an opening in said rear portion of said casing forming a rear discharge outlet, one of said openings having a plug therein and the other of said openings having a nipple therein, said openings adapting said pump for side or rear discharge by reversing the plug and nipple relationship of the openings, means forming a metering orifice in said casing between said discharge cavity chamber and said nipple and a valve assembly operatively interposed between said rotary fluid displacement means and said nipple to regulate the flow of said pump.

4. A pump comprising a generally circular valve cover plate member having mounting means formed thereon and including a discharge cavity chamber, an angular piston and rotary cylinder block type pump connected to said cover plate member and discharging fluid at increased pressure into said discharge cavity chamber, said pump including a pump housing, said pump housing having a flow control valve assembly formed therein regulating the flow output of said pump, said valve assembly having a pair of openings on different sides of said housing, and plug and nipple fittings mounted in said openings and extending outwardly of the pump to locate a discharge outlet for said pump on one of said different sides thereof, said pump having means forming a metering orifice therein between said discharge cavity chamber and said nipple.

5. A pump comprising a casing having an inlet and a discharge cavity chamber, rotary fluid displacement means in said casing for acting upon fluid drawn from said inlet and supplying the fluid at increased pressure to the discharge cavity chamber, and flow control means providing an outlet for said pump including angularly offset intersecting recesses formed in said casing and having openings extending out of different sides of said casing, each of said recesses having a discharge portion receiving fluid from said discharge cavity chamber, said openings having a plug and a flow nipple mounted in corresponding of said openings to direct the discharge of said pump out of one of said different sides of said casing, and means in said casing forming a metering orifice between said discharge cavity chamber and said opening in said one of said different sides of said casing.

6. A pump comprising a casing having an inlet and a discharge cavity chamber, rotary fluid displacement means in said casing for acting upon fluid drawn from said inlet and supplying the fluid at increased pressure to the discharge cavity chamber, and flow control means providing an outlet for said pump including angularly offset intersecting recesses formed in said casing and having openings extending out of different sides of said casing, each of said recesses having a discharge portion receiving fluid from said discharge cavity chamber, said openings having a plug and a flow nipple mounted in corresponding of said openings to direct the discharge of said pump out of one of said different sides of said casing, and means in said casing forming a metering orifice between said discharge cavity chamber and said opening in said one of said different sides of said casing, said flow control means further including a third passageway in said casing communicating at one end with said discharge cavity chamber, recirculating means in said third passageway communicating with said pump inlet and including a valve normally closing said third passageway, and means communicating metered flow pressure behind said valve, whereby said valve is subjected to a pressure differential to control the flow rate of the pump by recirculating partial pump discharge as a function of the pressure drop across the orifice.

7. A pump comprising a casing having an inlet and a discharge cavity chamber, rotary fluid displacement means in said casing for acting upon fluid drawn from said inlet and supplying same at increased pressure to the discharge cavity chamber, a flow control means providing an outlet for said pump including angularly offset intersecting recesses formed in said casing and having openings extending out of different sides of said casing, each of said recesses having a discharge portion receiving fluid from said discharge cavity chamber, said openings having a plug and a flow nipple mounted in corresponding of said openings to direct the discharge of said pump out of one of said different sides of said casing, and means in said casing forming a metering orifice between said discharge cavity chamber and said opening in said one of said different sides of said casing, said means forming said metering orifice comprising a recirculating means communicating with said pump inlet and being operable as a valve to regulate the flow rate through the valve to the outlet by recirculating partial pump discharge as a function of said pressure drop across the orifice.

8. A pump comprising a housing having an inlet and a discharge cavity chamber, rotary fluid pumping means of the angular piston and rotary cylinder block type in said housing for supplying fluid at increased pressure to said discharge cavity chamber, a valve cover plate at one end of said pump, a side discharge port formed in said valve cover plate communicating with said discharge cavity chamber, means forming a rear discharge port communicating with said discharge cavity chamber, and a rear inlet port for the pump in said housing, said side discharge port and said rear discharge port having a plug and a nipple mounted in corresponding ones of said ports and adapted to provide either side or rear discharge for said pump, means forming a metering orifice in said housing between said discharge cavity chamber and said nipple, and a flow control valve assembly operatively interposed between said rotary fluid pumping means and said nipple, thereby to adapt said pump for a side or rear metered discharge flow.

9. A pump comprising a cup-shaped casing having a rear and side portion and a discharge cavity chamber, means forming a rear discharge port communicating with said discharge cavity chamber, and a rear inlet port in the rear of the casing, a pump housing enclosed by said casing, an angular piston and rotary cylinder block type pressurizing means in said pump housing, flow control means in said pump housing for regulating the flow output of said pump, a valve cover plate closing the open end of said casing and having an internal face formed with a kidney-shaped inlet and outlet port abutting said pump housing, a discharge flow passage formed in said valve cover plate in registry with the outlet of said pump means, said flow control means having first and second pressure-responsive surfaces formed therein, said first surface being in opertaive registry with the outlet of said pump means, a side discharge port formed in said valve cover plate and registering with the pump outlet, said openings having a plug and flow nipple inserted in the corresponding discharge ports in said casing and valve cover plate, and means in said pump between said discharge cavity chamber and said nipple forming a flow metering orifice and means communicating metered pressure to said second surface, whereby discharge flow of said pump is maintained constant.

References Cited in the file of this patent

UNITED STATES PATENTS

| | | |
|---|---|---|
| 1,881,554 | Heckert | Oct. 11, 1932 |
| 2,036,489 | Murphy | Apr. 7, 1936 |
| 2,212,833 | Huber | Aug. 27, 1940 |
| 2,346,398 | Rohr et al. | Apr. 11, 1944 |
| 2,348,679 | Groves | May 9, 1944 |
| 2,372,816 | Deschamps et al. | Apr. 3, 1945 |
| 2,456,651 | Schmiel | Dec. 21, 1948 |
| 2,502,316 | Erikson | Mar. 28, 1950 |
| 2,544,990 | Harrington et al. | Mar. 13, 1951 |
| 2,623,466 | Tinker | Dec. 30, 1952 |
| 2,698,579 | Hammond | Jan. 4, 1955 |
| 2,742,862 | Banker | Apr. 24, 1956 |
| 2,752,853 | Eames | July 3, 1956 |
| 2,759,423 | Keel | Aug. 21, 1956 |
| 2,768,582 | Klessig et al. | Oct. 30, 1956 |
| 2,818,813 | Pettibone et al. | Jan. 7, 1958 |
| 2,827,854 | Huber | Mar. 25, 1958 |
| 2,839,003 | Thrap et al. | June 17, 1958 |
| 2,880,674 | Klessig et al. | Apr. 7, 1959 |
| 2,887,063 | Aspelin | May 19, 1959 |
| 2,923,245 | Aspelin | Feb. 2, 1960 |

FOREIGN PATENTS

| | | |
|---|---|---|
| 163,474 | Australia | Mar. 18, 1954 |